(12) United States Patent
Opprecht et al.

(10) Patent No.: US 11,780,007 B2
(45) Date of Patent: Oct. 10, 2023

(54) METHOD FOR MANUFACTURING AN ALUMINIUM ALLOY PART BY ADDITIVE MANUFACTURING FROM A MIXTURE OF POWDERS CONTAINING YTTRIA-STABILIZED ZIRCONIA

(71) Applicant: COMMISSARIAT A L'ENERGIE ATOMIQUE ET AUX ENERGIES ALTERNATIVES, Paris (FR)

(72) Inventors: Mathieu Opprecht, Grenoble (FR); Jean-Paul Garandet, Grenoble (FR); Guilhem Roux, Grenoble (FR); Mathieu Soulier, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 328 days.

(21) Appl. No.: 16/872,469

(22) Filed: May 12, 2020

(65) Prior Publication Data
US 2020/0360993 A1 Nov. 19, 2020

(30) Foreign Application Priority Data
May 13, 2019 (FR) .................................... 1904935

(51) Int. Cl.
*B22F 3/105* (2006.01)
*B33Y 70/10* (2020.01)
(Continued)

(52) U.S. Cl.
CPC .............. *B33Y 70/10* (2020.01); *B22F 3/105* (2013.01); *B22F 10/28* (2021.01); *B22F 10/32* (2021.01);
(Continued)

(58) Field of Classification Search
CPC ................... B23K 15/086; B28B 1/001; B22F 2003/1057
See application file for complete search history.

(56) References Cited

U.S. PATENT DOCUMENTS

| 2013/0307201 A1* | 11/2013 | McEnerney | C22C 29/12 |
| | | | 501/153 |
| 2014/0035205 A1* | 2/2014 | Hagiwara | B33Y 30/00 |
| | | | 264/497 |

(Continued)

FOREIGN PATENT DOCUMENTS

WO WO 2018/144323 A1 8/2018

OTHER PUBLICATIONS

"Turbula Shaker Mixer" 2015. Powder bulk solids. Retrieved from: https://www.powderbulksolids.com/mixers-blenders/turbula-shaker-mixer (Year: 2015).*

(Continued)

*Primary Examiner* — Nicholas A Wang
(74) *Attorney, Agent, or Firm* — Oblon, McClelland, Maier & Neustadt, L.L.P.

(57) ABSTRACT

Method for manufacturing an aluminium alloy part by additive manufacturing comprising a step during which a layer of a mixture of powders is locally melted and then solidified, characterised in that the mixture of powders comprises:
first particles comprising at least 80% by mass of aluminium and up to 20% by mass of one or more additional elements, and
second yttria-stabilized zirconia particles,
the mixture of powders comprising at least 1.5% by volume of second particles.

18 Claims, 5 Drawing Sheets

(51) Int. Cl.
  *B22F 10/28*   (2021.01)
  *B33Y 10/00*   (2015.01)
  *B33Y 80/00*   (2015.01)
  *B22F 10/32*   (2021.01)
  *B22F 10/34*   (2021.01)
  *B22F 10/36*   (2021.01)
  *B22F 10/366*  (2021.01)

(52) U.S. Cl.
  CPC ............... *B22F 10/34* (2021.01); *B22F 10/36* (2021.01); *B22F 10/366* (2021.01); *B22F 2202/11* (2013.01); *B22F 2301/052* (2013.01); *B22F 2301/058* (2013.01); *B22F 2301/205* (2013.01); *B22F 2301/45* (2013.01); *B33Y 10/00* (2014.12); *B33Y 80/00* (2014.12)

(56) References Cited

U.S. PATENT DOCUMENTS

| | | | |
|---|---|---|---|
| 2017/0226362 A1* | 8/2017 | Fratello | C09D 11/037 |
| 2018/0161874 A1 | 6/2018 | Nuechterlein et al. | |
| 2018/0369909 A1* | 12/2018 | Ibe | B22F 1/148 |
| 2019/0039183 A1 | 2/2019 | Morton et al. | |
| 2020/0024700 A1* | 1/2020 | Martin | C22C 1/10 |

OTHER PUBLICATIONS

French Preliminary Search Report dated Feb. 6, 2020 in French Application 19 04935 filed on May 13, 2019 (with English Translation of Categories of Cited Documents), 2 pages.

Martin et al., "3D printing of high-strength aluminium alloys", Nature, vol. 549, 2017, 15 pages.

Zhang, et al., "Effect of Zirconium addition on crack, microstructure and mechanical behavior of selective laser melted Al—Cu—Mg alloy", Scripta Materialia, vol. 134, 2017, pp. 6-10.

Shen, "Carbothermal synthesis of metal-functionalized nanostructures for energy and environmental applications", Journal of Materials Chemistry A, vol. 3, 2015, pp. 13114-13188.

Chu, et al., "Sintering of aluminum nitride by using alumina crucible and $MoSi_2$ heating element at temperature if 1650° C and 1700° C", Ceramics International vol. 35, 2009, pp. 3455-3461.

* cited by examiner

METHOD FOR MANUFACTURING AN ALUMINIUM ALLOY PART BY ADDITIVE MANUFACTURING FROM A MIXTURE OF POWDERS CONTAINING YTTRIA-STABILIZED ZIRCONIA

TECHNICAL FIELD

The present invention pertains to the general field of manufacturing aluminium alloy parts by additive manufacturing.

The invention relates to a method for manufacturing aluminium alloy parts from a powder mixture containing aluminium-based particles and particles containing yttria-stabilized zirconia.

The invention also relates to an aluminium alloy part obtained with this method.

The invention is particularly interesting since it allows overcoming the problems of hot cracking of aluminium alloys in additive manufacturing methods involving melting.

The invention finds applications in numerous industrial fields, and in particular in the fields of the automobile, aeronautics, energy (for example, for the manufacture of heat exchangers) or else in the case of structural reinforcement by unprocessed particles.

Prior Art

The various methods for manufacturing metal alloy parts by additive manufacturing (also called 3D printing) have in common the use of the raw material in the form of powders and the shaping of the metal alloy via a step of melting these powders.

The various additive manufacturing methods concerned particularly include powder bed fusion methods (or PBF for "Powder Bed Fusion") and methods for depositing matter under concentrated energy (or DED for "Directed Energy Deposition").

PBF methods consist in melting certain regions of a powder bed, for example by means of a laser beam. The DED methods consist in bringing the solid material, for example in the form of wire or powder, in melting it, for example by means of a laser beam, and in depositing the molten material.

With such methods, it is possible to industrially produce parts, of simple or complex shape, having satisfactory mechanical properties.

However, some aluminium alloys are subject to hot cracking problems resulting from a columnar dendritic solidification, at the origin of a microstructure sensitive to thermomechanical stresses during solidification, in particular for a solid fraction ranging from 0.9 to 0.98.

To overcome this disadvantage, various solutions have been considered.

For example, it is possible to modify the chemical composition of the powder alloy, using, in particular, Scamalloy. It is a light alloy comprising aluminium, magnesium and scandium, developed specifically for the additive manufacture. During solidification, primary $Al_3Sc$ particles precipitate from the liquid and act as germs for the growth of grain of the Al matrix. Scandium therefore allows a refinement of the microstructure and the development of an equiaxed dendritic solidification. However, Scandium is a particularly expensive element, which considerably increases the costs of the raw material.

Another solution consists in adding nanoparticles of a material called germinating material, cheaper than scandium, to the aluminium powder to promote equiaxed solidification.

In document WO 2018/144323 A1, aluminium alloy powders are mixed with nanoparticles of Zr, Ta, Nb, Ti or else one of their oxides, nitrides, hydrides, borides, carbides and aluminides to manufacture aluminium alloy parts by additive manufacturing. Among the various exemplary embodiments described, parts are manufactured by selective laser melting (also noted SLM) from, for example, a mixture comprising:
  aluminium and tantalum nanoparticles of 50 nm in diameter (1% by volume), or
  an aluminium alloy (Al7075 or Al6061) and zirconium nanoparticles of 500-1500 nm in diameter (1% by volume).

In the article by Zhang and al. ("Effect of Zirconium addition on crack, microstructure and mechanical behaviour of selective laser melted Al—Cu—Mg alloy", Scripta Materialia 134 (2017), 6-10), the refinement of the grains of an aluminium alloy Al—Cu—Mg is performed by adding 2% by mass of zirconium particles of average size 8.8 µm.

In the article by Martin and al. ("3D printing of high-strength aluminium alloys", Nature 549 (2017), pages 365-369), aluminium alloy powders of the series 7075 (bimodal distribution at 15 µm and 45 µm) and 6061 ($d_{50}$ of 45 µm) were mixed with 1% by volume of hydrogen-stabilised Zirconium ($ZrH_2$) nanoparticles to overcome the problem of hot cracking of aluminium alloys obtained by SLM. The nanoparticles are electrostatically assembled on the base powder to obtain a uniform distribution. No information is given on the particle size of the nanoparticles used.

DESCRIPTION OF THE INVENTION

A purpose of the present invention is to provide a method for manufacturing parts of aluminium alloys having no cracks, the method having to be simple to implement and inexpensive.

For this purpose, the present invention provides a method for manufacturing an aluminium alloy part by additive manufacturing comprising at least one step during which a layer of a mixture of powders is melted and then solidified, the mixture of powders comprising:
  first particles comprising at least 80% by mass of aluminium and up to 20% by mass of one or more additional elements, and
  second yttria-stabilized zirconia particles,
the mixture of powders comprising at least 1.5% by volume of second particles.

The invention is fundamentally distinguished from the prior art by the addition of yttria-stabilized zirconia particles ($ZrO_2$—$Y_2O_3$ more commonly called YSZ) to the aluminium-based powder. The addition of such particles allows promoting an equiaxed solidification structure and thus eliminating cracking in the final part.

Figure 1A:
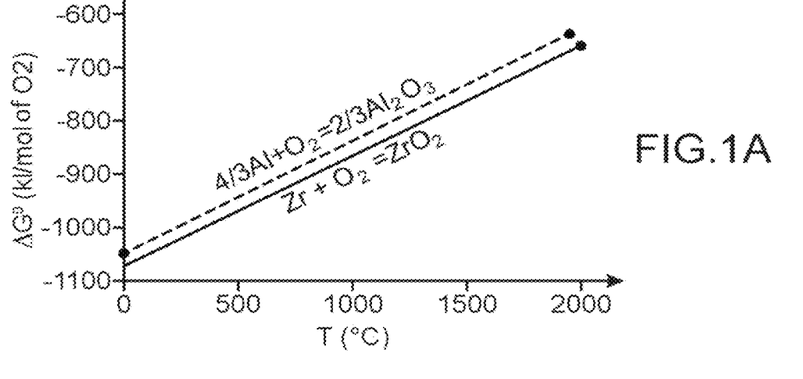
FIG. 1A, previously described, is an Ellingham diagram representing the stabilities of aluminium oxide ($Al_2O_3$) and zirconium oxide ($ZrO_2$).
Figure 1B:
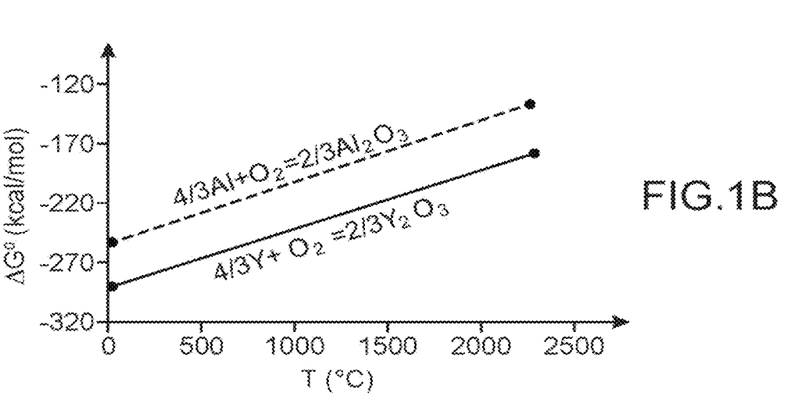
FIG. 1B, previously described, is an Ellingham diagram representing the stabilities of aluminium oxide ($Al_2O_3$) and yttrium oxide ($Y_2O_3$).

Unexpectedly, yttria-stabilized zirconia gives rise to germinating particles of $Al_3Zr$ by reaction with aluminium according to the following reactions:

Indeed, even if the zirconia ($ZrO_2$) and the yttria ($Y_2O_3$) seem more thermodynamically stable than the alumina regardless of the temperature (see the Ellingham diagrams shown in FIGS. 1A and 1B, obtained from the data extracted from articles by Shen [1] and Chu et al. [2] referenced at the end of the description), it has been observed that, during the additive manufacturing method, the germinating phase $Al_3Zr$ is formed by decomposition of the yttria-stabilized zirconia.

It did not seem obvious that this $Al_3Zr$ phase (2nd reaction) had time to germinate since the lifetimes of the molten metal baths formed during the method are relatively short (from a hundred microseconds to a millisecond). At first glance, this in situ reaction is neither thermodynamically nor kinetically favoured by the thermal conditions imposed by the method.

Advantageously, the powder mixture further comprises a reducing element. Reducing element means an element more reducing than Zr and Al. This element, when oxidised, promotes the heterogeneous germination of $Al_3Zr$, for example, by serving as a substrate for this germination.

The reducing element is preferably magnesium or one of its alloys (in particular MgAl).

The oxidation of the reducing element can result from a redox reaction in the presence of $Al_2O_3$ and/or from a reaction with oxygen resulting from the dissolution of the yttria-stabilized zirconia particles.

When the reducing element is in the presence of $Al_2O_3$, a redox reaction can take place, leading to the formation of Al and of an oxide of the reducing element (for example a magnesium Mg oxide (such as MgO) or an oxide of one of its alloys (preferably $MgAl_2O_4$)).

Alternatively, the method for manufacturing an aluminium alloy part by additive manufacturing can lead to the dissolution of the second yttria-stabilized zirconia particles. The oxygen thus released can directly associate with the reducing element to form the heterogeneous germination substrates.

Advantageously, the mixture comprises at least 0.5% by mass of the reducing element. For example, the mixture comprises between 0.5 and 10% by mass, preferably between 0.6 and 5% by mass, even more preferably between 0.7 and 2% by mass of reducing element.

Preferably, the reducing element is present in the first particles, i.e. one of the additional elements of the aluminium alloy is the reducing element.

For alloy grades not including a reducing element, the latter can be added in particulate form to the mixture. For example, Mg metal particles can be added. Magnesium oxide particles can also be added.

According to a particular embodiment, for the grades of alloys containing Mg, it is also possible to add metallic magnesium to compensate for the differential evaporation likely to occur during the additive manufacturing process.

Advantageously, the yttria-stabilized zirconia is a stable oxide, easy to handle and/or to store, compared to metallic elements known to be highly reducing.

Advantageously, the second particles have a larger dimension ranging from 5 nm to 600 nm, preferably from 100 nm to 400 nm, and even more preferably from 200 nm to 300 nm.

Advantageously, the volume percentage of second particles (YSZ) in the powder mixture ranges from 1.5% to 5% and even more preferably from 1.5% to 2.5%.

Advantageously, the first particles have a larger dimension ranging from 10 µm to 100 µm, and preferably from 20 µm to 65 µm.

Advantageously, the additional elements are selected from Cu, Si, Zn, Mg, Fe, Ti, Mn, Zr, Va, Ni, Pb, Bi and Cr.

Advantageously, the aluminium alloy is the alloy 7075, the alloy 6061, the alloy 2219 or the alloy 2024.

According to a first advantageous variant embodiment, the manufacturing method is a selective laser melting method.

According to a second advantageous variant embodiment, the manufacturing method is a selective electron beam melting method.

Advantageously, the mixing of powders is carried out in a 3D dynamic mixer or by mechanical synthesis (mechanosynthesis).

Advantageously, the specific surface of the mixture, after mixing with the dynamic 3D mixer, is greater than 0.3 m²/g.

The method has many advantages:
  simple to implement, since it is sufficient to mix powders. It is a dry step, quick to perform and simple to set up, regardless of the amount of powders;
  inexpensive, and therefore interesting from an industrial point of view. By way of illustration, the material cost of an aluminium alloy 6061 is around 60 €/kg and the material cost of a mixture of powders comprising the aluminium alloy 6061 and yttria-stabilized zirconia (1.5% volume) is approximately 61.71 €/kg; tantalum oxides and $ZrH_2$ are significantly more expensive than yttria-stabilized zirconia (at least 15 times more expensive);
  being able to easily store/handle yttria-stabilized zirconia powder, since it is an oxide: there is no need to use an inert atmosphere;
  being able to easily modify the volume ratio between the powders when mixing the powder,
  easily adaptable for any additive manufacturing method and for any aluminium alloy subject to the problem of hot cracking,
  being able to use the parameters conventionally used in additive manufacturing methods.

The invention also relates to an aluminium alloy part (or workpiece), obtained according to the method described above, the part comprising yttria-stabilized zirconia. The part is free from cracking/crack.

Advantageously, the part is a heat exchanger.

Other features and advantages of the invention will emerge from the additional description which follows.

It goes without saying that this additional description is given only by way of illustration of the object of the invention and should in no case be interpreted as a limitation of this object.

BRIEF DESCRIPTION OF THE DRAWINGS

The present invention will be better understood upon reading the description of exemplary embodiments given in a purely indicative and in no way limiting manner, with reference to the appended drawings in which.

The different parts shown in the figures are not necessarily shown on a uniform scale, to make the figures more readable.

The different possibilities (variants and embodiments) must be understood as not being mutually exclusive and can be combined with one another.

Detailed Description of Particular Embodiments

The method for manufacturing an aluminium alloy part (or workpiece) by additive manufacturing comprises the following successive steps:

a) providing a powder mixture comprising, and preferably consisting of:
   a first powder comprising first particles 10 of a first material comprising at least 80% by mass of aluminium and up to 20% by mass of one or more additional elements,
   a second powder comprising second particles 20 made of a second material, the second material being yttria-stabilized zirconia,
b) forming a layer of the powder mixture,
c) locally melting the layer of the powder mixture, preferably by scanning a laser beam or by scanning an electron beam, so as to form a plurality of molten areas,
d) cooling the plurality of molten areas in step c) so as to form a plurality of solidified areas, this plurality of solidified areas constituting the first elements of the parts to be constructed.

Advantageously, steps b), c) and d) can be repeated at least once so as to form at least one other solidified area on the first solidified area. The method is repeated until the final shape of the part is obtained. The first layer of powder mixture is formed on a substrate.

The addition of yttria-stabilized zirconia particles 20 (YSZ), to the first particles 10 of interest based on aluminium allows obtaining an equiaxed solidification structure and a final aluminium alloy part without cracking.

Figure 2:
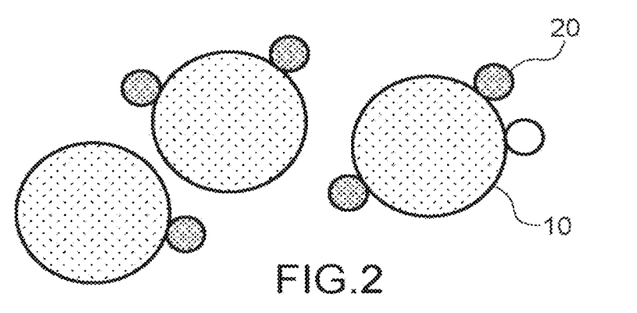
FIG. 2 schematically shows a mixture of powders according to a particular embodiment of the method of the invention.
Figure 3A:
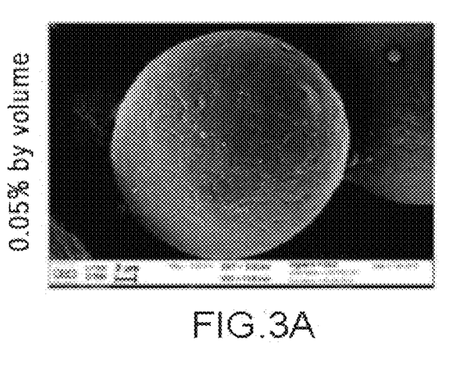
FIGS. 3A, 3B, 3C and 3D are photos obtained with a scanning electron microscope (SEM) of aluminium particles and yttria-stabilized zirconia (YSZ) particles at different volume concentrations according to a particular embodiment of the invention.
Figure 3B:
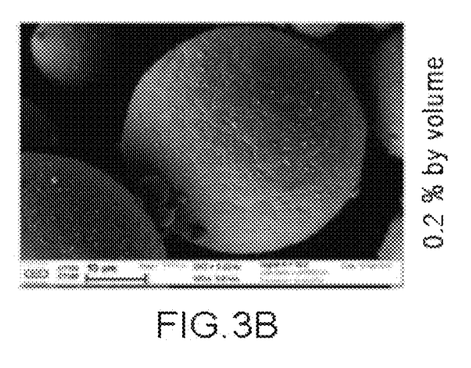
Figure 3C:
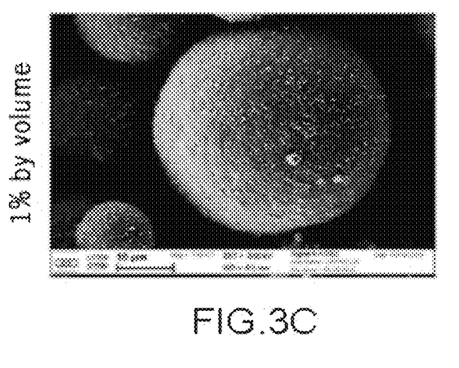
Figure 3D:
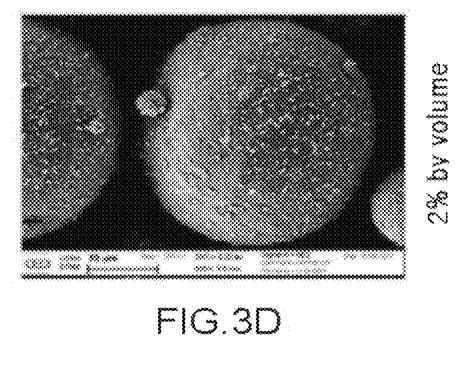

Preferably, the first particles 10 are functionalised by the second particles 20 (FIG. 2).

Preferably, the second particles 20 are made of yttria-stabilized zirconia.

The yttria-stabilized zirconia advantageously comprises from 1 to 10% by mass, and preferably from 3% to 10% by mass, of yttrium oxide. It can also contain small amounts (typically less than 3% by mass) of pollutants, conventionally encountered in the methods for manufacturing powders, in particular oxides such as, for example, hafnium oxide.

The second yttria-stabilized zirconia powder preferably represents at least 1.5% by volume of the powder mixture, preferably from 1.5% to 5%, for example from 1.5% to 2.5%.

According to an advantageous embodiment, the first particles 10 have a larger dimension ranging from 10 µm to 120 µm and the second particles 20 have a larger dimension ranging from 5 nm to 600 nm and, preferably, from 100 nm to 600 nm, even more preferably from 100 nm to 400 nm, and even more preferably from 200 nm to 300 nm.

The first particles 10 and the second particles 20 are elements which can be of spherical, ovoid or elongated shape. Preferably, the particles are substantially spherical and their largest dimension is their diameter.

The first powder is formed of first particles 10 made of a first material. The first material comprises at least 80% by mass of aluminium, and preferably at least 90% by mass of aluminium.

The first particles 10 can comprise up to 20% and preferably up to 10% by mass of one or more additional elements (also called alloy elements). These elements are preferably selected from zinc, magnesium, copper, silicon, iron, manganese, titanium, vanadium, bismuth, lead, nickel, zirconium and chromium.

Preferably, the alloy is an aluminium alloy 7075, an alloy 2024, an alloy 2219 or an aluminium alloy 6061.

Advantageously, the powder mixture furthermore comprises a reducing element, preferably magnesium or one of its alloys (in particular MgAl).

Preferably, the mixture comprises at least 0.5% by mass of the reducing element. For example, the mixture comprises between 0.5 and 10% by mass, preferably between 0.6 and 5% by mass, even more preferably between 0.7 and 2% by mass of reducing element.

The reducing element may be present in the first particles or added in a particulate form to the mixture provided in step a).

The powder mixture provided in step a) is produced before the additive manufacturing method.

In a preferred embodiment of the invention, the first powder and the second powder are mixed with the 3D dynamic mixer, for example with a Turbula® mixer. Alternatively, it could be a mechano-synthesis method.

In step c), a sufficiently energetic beam is used to melt at least the first particles 10.

The deposited layer can be locally melted or completely melted.

The melting step creates melted patterns in the powder mixture layer. One or more areas of molten particles can be produced to form the desired pattern. The particles 10 forming the pattern melt completely so as to lead, during solidification (step d), to one or more areas solidified in an aluminium alloy.

Advantageously, steps b), c) and d) can be repeated at least once so as to form at least one other solidified area on the first solidified area. The method is repeated until the final shape of the part is obtained.

The non-solidified powders are then removed and the final part is detached from the substrate.

The part obtained, according to one of these methods, can be subjected to an annealing step (heat treatment) to reduce internal stresses and improve mechanical properties.

According to a first variant embodiment, it is a laser melting method on a powder bed (SLM). In an illustrative and non-limiting manner, the parameters of the manufacturing method by laser melting on a powder bed are:
between 50 and 500 W for laser power;
between 100 and 2000 mm/s for laser speed;
between 25 and 120 µm for the distance between two vector spaces ("hatch");
between 15 and 60 µm for the layer thickness.

According to another variant embodiment, this is a powder bed electron beam melting (EBM) method. In an illustrative and non-limiting manner, the parameters of the manufacturing method by electron beam melting on a powder bed are
between 50 and 3000 W for the electron beam;
between 100 and 8000 mm/s for the beam speed;
between 50 and 150 µm for the distance between two vector spaces;
between 40 and 60 µm for the layer thickness.

The deposition machines used for the additive manufacturing methods comprise, for example, a powder delivery system, a device for spreading and homogenising the surface of the powder ("Roller" or "Blade"), a beam (for example an infrared laser beam at a wavelength of 1060 nm approximately), a scanner to direct the beam, and a substrate (also called plate) which can descend vertically (along an axis Z perpendicular to the powder bed).

The assembly can be confined in a thermally closed and inert enclosure, to control the atmosphere, but also to avoid the dissemination of powders.

Although not in any way limiting, the invention finds particular applications in the energy field, and more particularly, heat exchangers, in the aeronautics field and in the automobile field.

Illustrative and Non-Limiting Examples of an Embodiment

In this example, cube-shaped parts of dimensions 10 mm*10 mm*10 mm are produced by printing by SLM.

The part is obtained from a mixture of two powders: an aluminium alloy powder and an YSZ powder.

The granulometry of the aluminium alloy powder (Al6061) is as follows: $d_{10}$=27.5 µm, $d_{50}$=41.5 µm and $d_{90}$=62.7 µm.

Regarding the YSZ powder, its granulometry is as follows: diameter from 120 nm to 600 nm. The powder is sold by the company Innovnano Materials under the reference 2YSZ. It contains 3.5% by mass of $Y_2O_3$.

Aluminium powder is baked at 180° C. for 2 hours. Then the mixing of the two powders is performed in a glove box from: 1200 mL of aluminium alloy powder to be refined, 24 mL of yttria-stabilized zirconia powder (mixture at 2% by volume), and 250 mL of Zirconia beads with a diameter of 3 mm, used to homogenise the mixture. The volume of the mixing pot is 6.5 L.

The filling rate, defined as the ratio of the volume represented by the particles 10, the particles 20 and the zirconia beads to the volume of the mixing pot, is approximately 23%.

The mixture is passed to the 3D dynamic mixer, for example to Turbula®, for 6 hours.

The mixture is finally coarsely-sieved (1 mm) to recover the zirconia beads.

Different powder mixtures have been tested: the volume percentage of YSZ powders ranges from 0.05% to 2% by volume. The powder mixtures were observed with SEM (FIG. 3A to 3D). The aluminium alloy 6061 particles appear in grey and the YSZ particles in white.

The mixtures are then used to manufacture parts by 3D printing. By way of illustration, the SLM conditions allowing the densest cubes to be obtained are as follows: laser power: 190-270 W; laser speed: 400-800 mm/s, vector space: 100 µm; layer thickness (powder bed): 20 µm.

For comparison, an aluminium part is manufactured without adding YSZ powders.

Figure 4A:
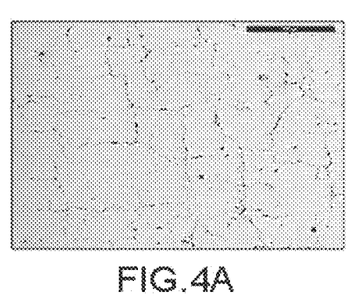
FIG. 4A is a photo obtained with an optical microscope along the plane XY of a part manufactured from aluminium alloy 6061 particles.
Figure 4B:
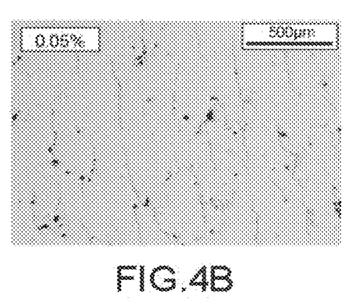
FIGS. 4B, 4C, 4D and 4E are photos obtained with an optical microscope according to the plane XY of a part made from a mixture of aluminium alloy 6061 particles and YSZ particles at different volume concentrations according to different embodiments of the invention.
Figure 4C:
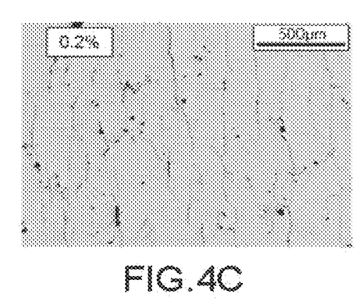
Figure 4D:
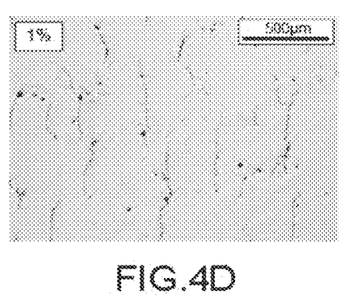
Figure 4E:
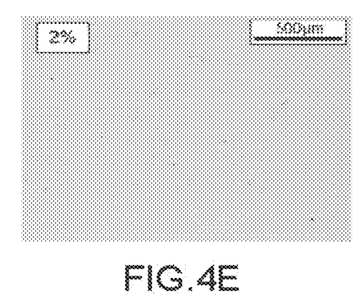

Parts manufactured only with aluminium powder (FIG. 4A) or with powder mixtures containing 0.05% to 1% by volume of YSZ (FIG. 4B to 4D) have cracks. The part obtained with the powder mixture containing 2% by volume of YSZ powders is a dense part without cracks (FIG. 4E).

Figure 5A:
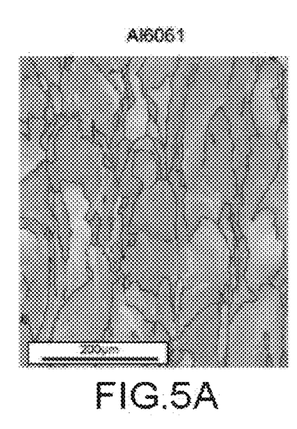
FIGS. 5A and 5B are electron backscatter diffraction (EBSD) images along the plane XZ of a part manufactured from aluminium particles and of a part manufactured, according to a particular embodiment of the invention, from a mixture of aluminium alloy 6061 particles and 2% by volume of YSZ particles.
Figure 5B:
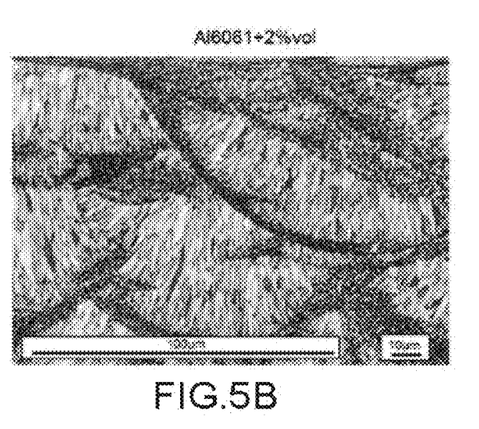

The part produced without adding YSZ powder and that produced with 2% by volume of YSZ were characterised by electron backscatter diffraction (FIGS. 5A and 5B respectively): adding 2% by volume of YSZ leads to a refinement of the microstructure.

Figure 6A:
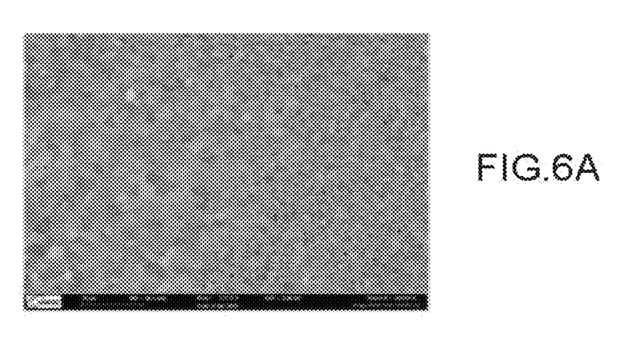
FIGS. 6A and 6B are photos obtained with an electron backscatter scanning electron microscope, along the plane XY and along the plane XZ respectively, of a part manufactured from a mixture of aluminium alloy 6061 particles and 2% by volume of YSZ particles, according to a particular embodiment of the invention.
Figure 6B:
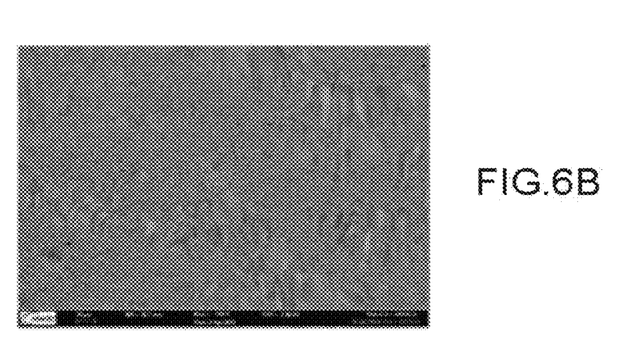

The aluminium part manufactured with 2% by volume of YSZ was also characterised by SEM. Whether in the plane XZ (FIG. 6A) or in the plane XY (FIG. 6B), the refinement of the grains is perfectly visible. The axis Z corresponds to the construction axis, i.e. the axis of the stacking of the layers of the powder mixture (or axis perpendicular to the construction plate); the axes X and Y correspond to the axes of the construction plate, i.e. the axes X and Y are parallel to the main surface of the construction plate on which the layers of powder mixture are deposited.

Figure 7:
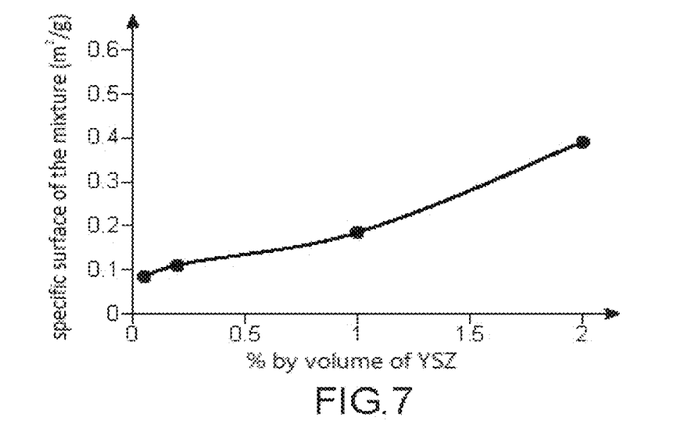
FIG. 7 is a graph showing the specific surface of the mixture as a function of the volume percentage of YSZ, according to a particular embodiment of the invention.
Figure 8A:
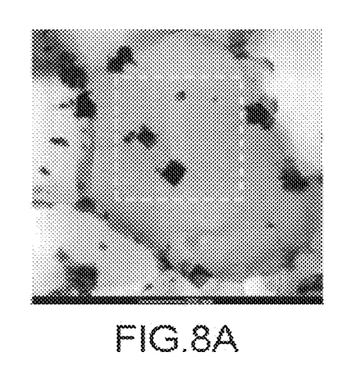
FIG. 8A is a photo obtained by transmission electron microscopy of a part of a workpiece manufactured according to a particular embodiment of the invention.
Figure 8B:
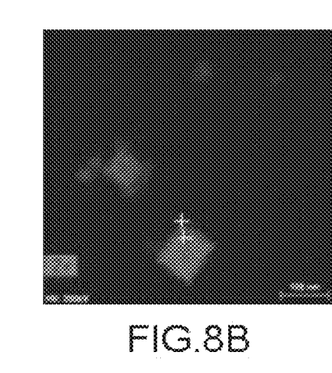
FIGS. 8B, 8C and 8D are maps of the elements Zr, 0 and Mg, produced in the box of FIG. 8A.
Figure 8C:
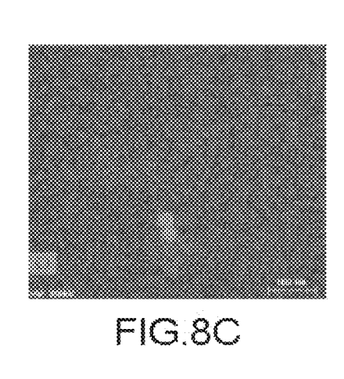
Figure 8D:
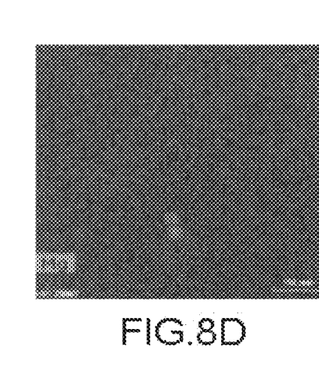

Finally, specific surface measurements by BET were carried out on the various powder mixtures (FIG. 7). It is found that a specific surface of at least 0.3 $m^2/g$ is required to overcome the hot cracking problems. These measurements could form another source of characterisation in terms of the amount of germinants to be added to avoid cracking phenomena.

A characterization by transmission electron microscopy confirms the presence of an oxide containing magnesium (FIGS. 8A to 8D).

REFERENCES

[1] Shen "Carbothermal synthesis of metal-functionalized nanostructures for energy and environmental applications", J. Mater. Chem. A 3 (2015), 13114-13188.
[2] Chu and al. "Sintering of aluminium nitride by using alumina crucible and $MoSi_2$ heating element at temperatures of 1650° C. and 1700° C.", Ceramics International 35 (2009), 3455-3461.

The invention claimed is:

1. A method for manufacturing an aluminum alloy part by additive manufacturing, the method comprising:
locally melting a layer of a mixture of powders and then solidifying,
wherein the mixture of powders comprises:
85 to 98.5 vol. % of first particles comprising at least 80% by mass of aluminum and up to 20% by mass of one or more additional elements; and
1.5 to 2.5 vol. % of second particles comprising yttria-stabilized zirconia,
wherein the second particles have a largest dimension in a range of from 5 to 600 nm.

2. The method of claim 1, wherein the largest dimension of the second particles is in a range of from 100 to 400 nm.

3. The method of claim 1, wherein the largest dimension of the second particles is in a range of from 200 to 300 nm.

4. The method of claim 1, wherein the first particles have a largest dimension in a range of from 10 µm to 100 µm.

5. The method of claim 1, wherein the first particles have a largest dimension in a range of from 20 µm to 65 µm.

6. The method of claim 1, wherein the one or more additional elements are selected from the group consisting of Cu, Si, Zn, Mg, Fe, Ti, Mn, Zr, Ni, Pb, Bi, and Cr.

7. The method of claim 1, wherein the aluminum alloy is alloy 7075, alloy 2024, alloy 2219, or alloy 6061.

8. The method of claim 1, wherein the method for manufacturing an aluminum alloy part is a selective laser melting method or a selective electron beam melting method.

9. The method of claim 1, comprising:
   obtaining the mixture of powders in a 3D dynamic mixer or by mechano-synthesis.

10. The method of claim 1, wherein the mixture of powders has a specific surface greater than 0.3 m$^2$/g.

11. The method of claim 1, wherein the mixture of powders further comprises a reducing element.

12. The method of claim 11, wherein the reducing element is magnesium.

13. The method of claim 11, wherein the mixture of powders comprises at least 0.5% by mass of the reducing element.

14. The method of claim 11, wherein the mixture of powders comprises between 0.5% and 10% by mass of the reducing element.

15. The method of claim 11, wherein the reducing element is present in the first particles.

16. The method of claim 1, further comprising:
   adding a reducing element comprising Mg to the mixture prior to the solidifying.

17. The method of claim 1, wherein the aluminum alloy part has fewer cracks than an otherwise identical aluminum alloy part having no more than 1 vol. % of the first particles.

18. The method of claim 1, wherein the largest dimension of the second particles is in a range of from 200 to 300 nm,
   wherein the first particles have a largest dimension in a range of from 20 µm to 65 µm, and
   wherein the mixture of powders has a specific surface greater than 0.3 m$^2$/g.

* * * * *